Oct. 23, 1962     I. L. WISSMILLER     3,059,804
SAFETY DEVICE FOR INSULATED TANK
Filed Feb. 8, 1961
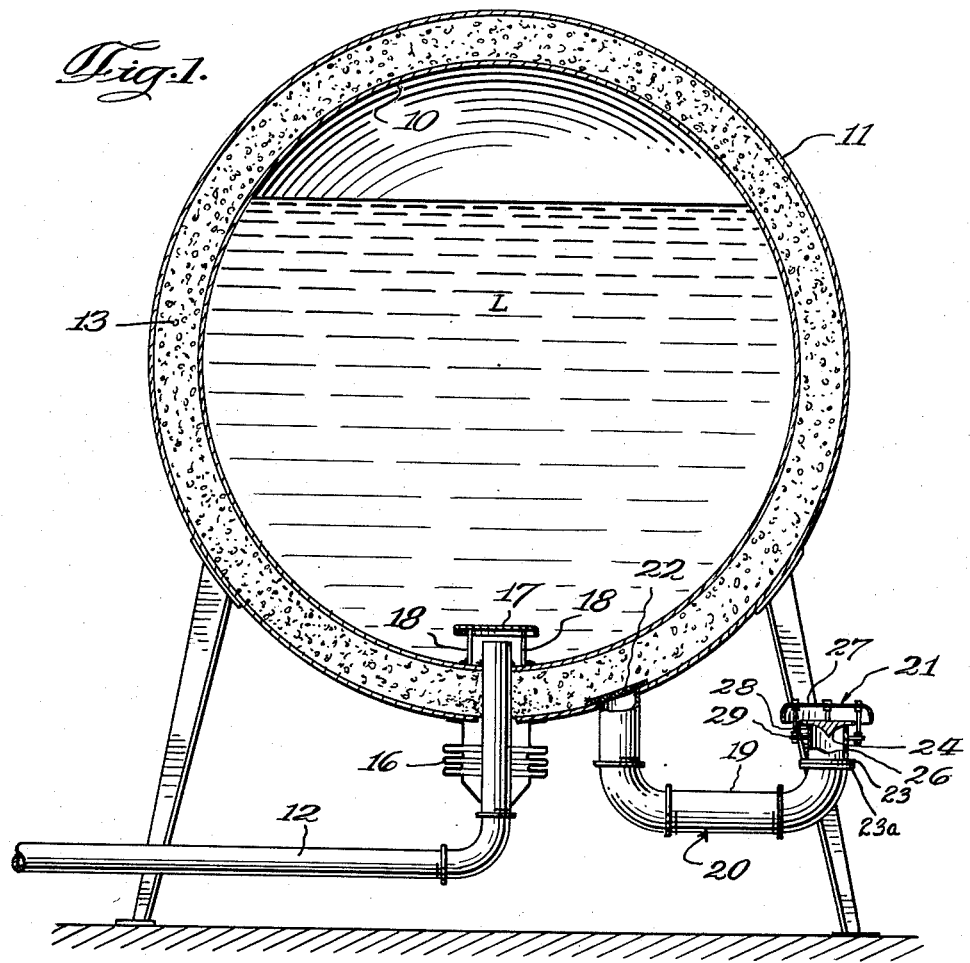
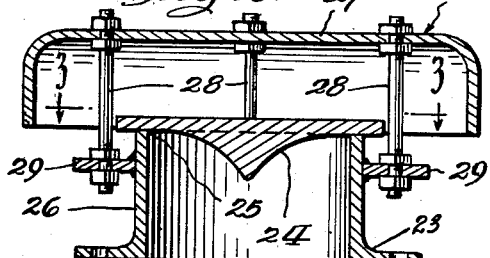
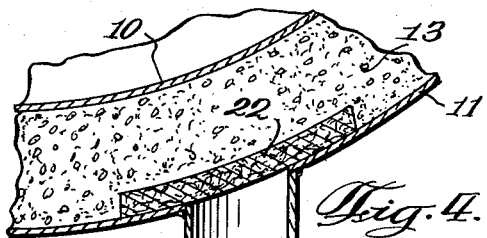
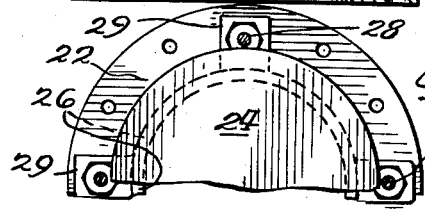

3,059,804
SAFETY DEVICE FOR INSULATED TANK
Ivan L. Wissmiller, Chicago, Ill., assignor to Chicago Bridge & Iron Company, Chicago, Ill., a corporation of Illinois
Filed Feb. 8, 1961, Ser. No. 87,911
5 Claims. (Cl. 220—14)

This invention relates to storage tanks for low temperature service. It is more particularly concerned with a safety device for double-walled storage tanks to prevent liquid accumulation in the insulation space of a double-walled storage tank having insulation between the walls of the inner and outer tank.

Helium, hydrogen, nitrogen, oxygen, methane, propane, ammonia and other such normally gaseous materials are often stored in tanks in the liquid phase at reduced temperatures. The temperature is reduced by refrigeration in order to facilitate the liquefaction of these normally gaseous substances and in order to reduce the required storage pressure. By liquefying the substance and reducing the pressure, a very substantial saving in cost of the storage vessel is achieved.

The inner tank is designed to accommodate the low temperature of the stored liquid and to hold the weight, hydrostatic pressure and the gas pressure of the stored substance. The inner tank can have any suitable shape, such as a vertical cylindrical wall having a flat horizontal bottom and dome roof; spherical or ellipsoidal; or cylindrical, vertical or horizontal, with dome or hemi-ellipsoidal ends. Ordinary plate steel is not suitable for the construction of the inner tank because it does not have adequate ductility and toughness to avoid the possibility of failure due to crack propagation at the low temperature of the stored liquid. The inner tank is therefore constructed of a special and more expensive metal. For ammonia and propane, the temperatures may be in the $-28°$ to $-50°$ F. range and manganese and nickel are required as alloys in the steel and special heat treatment is employed to improve steels for the low temperature service. For lower temperatures, stainless steel, aluminum and high-nickel (9%) alloy steels are used all at substantially increased cost over ordinary steel.

The inner tank is completely encased inside an outer steel shell and spaced apart to provide an insulation space between the inner storage vessel and outer shell. The width of the insulation space between the bottoms, sidewalls and roofs of the two tanks is commonly 36 inches but may vary from 6 inches to 72 inches depending upon the insulation requirement and the clearances needed for construction of the tanks and pipe connections. The insulation space between the inner vessel and outer shell is filled with thermal insulation material. If preferred, high vacuum can also be employed in conjunction with the solid insulating material to improve the thermal insulation. The outer shell serves to confine the insulation and to provide a positive barrier to atmospheric moisture and precipitation which would seriously impair the insulation. A suitable arrangement of insulated double tanks is shown in my co-pending application, U.S. Serial No. 762,520 filed September 22, 1958.

The outer shell is very light in construction because its only function is to hold the insulation in place and to provide a tight barrier against the ambient elements. It is not strong enough to safely carry a substantial, internal liquid pressure and it is made of ordinary steel which is not sufficiently ductile at low temperature to accommodate the stored liquid.

Furthermore, it is necessary to provide several pipes and tubes extending through the outer shell and insulation space into the interior of the inner vessel. These connections are used for transferring stored liquid to and from the inner vessel and for instrumentation such as liquid-level gaging, sampling, measuring temperatures and the like. These connections through the insulation space are possible sources of leakage of cold stored liquid into the insulation space. In addition there is a possibility of a flaw in the inner tank walls which will permit cold liquid to flow into the insulation space.

In the event of such leakage of cold liquid into the insulation space the liquid level would gradually rise therein subjecting the outer tank to the low temperature for which the metal in the outer tank is not suited. As the liquid level rises the outer shell will also be highly stressed by the resulting hydrostatic pressure. Under these conditions the outer shell could rupture suddenly releasing a large quantity of cold liquid. The sudden release of liquid can be dangerous because (a) it is extremely cold and will kill or seriously injure any person who may come into contact with it, (b) it may be flammable or (c) in the case of liquid oxygen it may cause spontaneous ignition of organic materials outside the tank. A sudden large spill is particularly hazardous because the liquid will flow over the ground for great distances from the tank, and, even when vaporized, the vapors flow in a similar manner if heavier than air, which is the case with methane, propane, and other such gases.

According to this invention there is provided a safety device which will prevent the sudden release of a large quantity of dangerous liquid in the event of leakage of the stored material into the insulation space of a double-walled storage tank.

Referring to the drawings:
FIGURE 1 is a cross-sectional view of a spherical double-walled storage tank schematically illustrating the installation thereon of an embodiment of the safety device of this invention;
FIGURE 2 is an enlarged cross-sectional view of a poppet valve employed as a flow control means for closing the safety device;
FIGURE 3 is a cross-sectional plan view taken along line 3—3 of the poppet valve shown in FIGURE 2; and
FIGURE 4 is an illustration of an alternative flow control means employing a frangible diaphragm which can be used in the subject invention.

The illustrative spherical refrigerated storage tank shown in FIGURE 1 comprises the inner vessel 10 and the outer shell 11. A typical pipe connection 12 is shown to illustrate a possible point of leakage of stored liquid into the insulation space 13 formed by the spacing of the inner vessel 10 and outer shell 11. The inner vessel 10 and piping 12 are made of special metal which retains its ductility and is not embrittled at the low storage temperature of the stored liquid L. Piping 12 in penetrating the wall of the inner vessel 10 is preferably welded in place. An opening 14 is provided in the wall of outer shell 11 through which piping 12 passes. To maintain fluid-tight integrity between the wall opening 14 and piping 12, a conventional bellows coupling 16 secured at one end to the wall of the outer shell surrounding opening 14 and at the other end to the wall of piping 12 is employed. Upon thermally induced expansion and contraction of the piping 12, the bellows 16 moves accordingly without interfering with the fluid-tight relationship. A cap baffle 17 raised above the inlet of piping 12 and spaced from the wall of the inner vessel by support legs 18 is used as a splash plate.

The outer shell 11 confines the insulation 13 and is made as thin as possible for economy. Also for economy it is made of ordinary steel which is brittle at the temperature of the stored liquid.

To effectuate the objectives of this invention there is provided a stored liquid accumulator communicating with the insulation space of the tank. In the illustrative embodiment it comprises an accumulator 19 having an inlet communicating at one end with the interior of the insulation space from a point adjacent the bottom of the insulation space 13 and having mounted on the outlet end a normally closed flow control means 21 such as a pressure relief valve which is shown in FIGURE 1. An accumulator chamber 20 is located intermediate the inlet and outlet. A screen or filter element 22 can be provided, if necessary, to cover the inlet of the accumulator into the insulation space 13 to prevent the flow of solid insulation into the accumulator chamber 20.

The accumulator is located below the lowest level of the insulation space to collect any liquid which leaks into the insulation space for subsequent discharge to the atmosphere. The accumulator is designed so that it can receive and discharge to the atmosphere any stored liquid leakage before it can collect in the insulation space. Accordingly it is sized to have a capacity and flow control sufficient to take the maximum leakage which might occur in the tank structure. The leakage can be released to the atmosphere or recovered in a suitable vapor recovery system.

Various valves can be employed as pressure relief valves 21. In FIGURE 2 is shown an illustrative pressure relief valve suitable for the release of liquid comprising flange 23 which is bolted to the flange 23a at the outer end of the accumulator 20 as shown in FIGURE 1. The poppet element 24 rests on the seat 25 of the valve body 26 and forms a fluid-tight seal against any gas pressure which might be present under normal operating conditions in the insulation space. A normal gas pressure might exist for example, due to the use of an inert gas to replace any air from within the space. A weather hood 27 is supported by several legs 28 held by brackets 29 mounted on valve body 26 to form a cage about the poppet element 24 to retain the poppet element 24 in place but permit it to freely rise when an excess pressure is applied to it and re-seat after the pressure has been relieved. The poppet element 24 is set at a pressure higher than the normal gas pressure in the insulation space 13 but adjusted to open when stored liquid material which has leaked into the insulation space enters the pipe connection 20 and the hydrostatic head of the liquid increases the pressure on the poppet element 24 of the valve 21. The relief valve is located at an elevation lower than the bottom of the tank insulation space so that the liquid head on the valve will be substantial before liquid can accumulate in said space.

If a small leak occurs in the inner tank 10 or one of the several piping connections illustrated by piping 12, the cold liquid will slowly accumulate in the insulation space 13. After a substantial accumulation the shell outer tank 11 will become embrittled and susceptible to failure similar to the shattering of glass. If this occurs the accumulated liquid in the insulation space will be suddenly discharged with potentially disastrous results. By using the instant invention an accumulated liquid enters the accumulator 19 and the hydrostatic head increases the pressure on the poppet element 24. The valve 21 will open when the pressure in the pipe exceeds the weight of the poppet 24. The weight of the poppet element 24 is adjusted so that the valve will open and release liquid when liquid partly fills the accumulator 19 and before liquid accumulates in the bottom of the insulation space 13. Thus the cold liquid which may leak into the insulation space 13 of the storage vessel is slowly released at the valve where it may be dissipated safely by vaporizing to the atmosphere or conducted to some location where it can be recovered in a vapor conservation system flared or otherwise disposed of. Without the accumulator 19 and pressure relief valve 21, the cold liquid from a leak would accumulate in the insulation space and then a large quantity would be suddenly and dangerously released when the outer tank fails. To avoid this sudden and dangerous spill, the safety device of this invention is used.

Alternatively, the pressure relief valve 21 can be replaced by a frangible diaphragm type of pressure. FIGURE 4 shows a fragmentary view of the inner tank 10, the outer tank 11 and the insulation space 13. The pipe connection 20 and filter or screen 22 are employed as above described. At the outlet end of the accumulator 19, a frangible diaphragm 30 susceptible to embrittlement rupturing at low temperatures is attached by means of a cooperating flange mounting 31 wherein the diaphragm 30 is sandwiched between a pair of flanges which are bolted together. The diaphragm 30 is made of a material that is strong and pliable at normal temperature. Accordingly, it will provide a tight seal in normal service when its temperature is near the ambient temperature of the atmosphere outside the storage vessel. When a small leak occurs in the inner tank 10 or in one of the several pipe connections, as illustrated by connection 12, in the insulation space 13, cold liquid will enter the accumulator 19 and contact the diaphragm 30. The cold temperature will make said diaphragm brittle and weak so that it will rupture before a substantial amount of liquid can accumulate in the insulation space. The diaphragm 30 can be made of a suitable material such as one of the several sheet plastic or synthetic rubber materials including polyvinyl chloride, polyethylene, buna-N, or other materials which exhibit the property of extreme brittleness at low temperature and high strength at normal temperature. The frangible diaphragm can also be replaced with a poppet valve having a closure means spring-loaded in the normally closed position but opening upon an accumulation of an escaped stored material in the chamber 20.

In an illustrative embodiment of the instant invention, the safety device was employed in a flat bottom double-wall vessel having a cylindrical inner storage vessel. The device was assembled using 10-inch pipe. One section extended through the wall of the outer shell terminating in a downwardly directed inlet. A U-shaped accumulator was attached to the other end of the section extending through the wall of the outer shell. The bottom of the U was positioned below the bottom of the inner storage vessel and the outlet of the U-shaped section was capped with a conventional poppet valve attached to the accumulator by flanges. The valve used for the release of any accumulated material was an S & J figure 7575 valve.

The instant invention has particular application in the storage of liquefied gaseous materials such as oxygen, air, nitrogen, methane, etc., in vessels having capacities of 5,000 to 4,000,000 gallons; however, other tank sizes can be used. The inner vessel can be constructed of materials which do not become brittle in the low temperature service to which they are exposed. In the construction of the tank employed in this invention, conventional materials of construction can be used. For low temperature service, those structural elements exposed to low temperature should be fabricated from stainless steels, nickel alloy steels or other materials which are not deleteriously embrittled at the low temperatures experienced. Granular, shredded, or other particulate insulation can be used in the insulating space. Perlite, for example, is an excellent low temperature insulation.

For simplicity, the various auxiliary equipment and piping associated with the filling, emptying, venting, etc., of storage tanks are not shown because piping arrangements not affecting the instant invention can be used. Accordingly, although the instant invention has been described with reference to the foregoing specific embodiments, it is evident that variations and modifications can be made by those skilled in this art without departing from the scope of this invention.

What is claimed is:

1. In a double-walled storage tank for the low temperature storage of liquid materials comprising an inner storage vessel and an outer shell encompassing said inner vessel and spaced apart therefrom to provide an insulation space and a vapor barrier, said shell being constructed from a material of construction susceptible to embrittlement and loss in ductility at the temperature of the stored material; a safety device for preventing the accumulation of any stored liquid in the insulation space which comprises an accumulator having an inlet means communicating with said insulation space immediately adjacent the lowest level thereof, an outlet means discharging to the exterior of said tank, a chamber disposed below the lowest level of said insulation space and a flow control means closing said outlet means, said flow control means being normally closed and having closure means at least partially controllable by a hydraulic head of fluid accumulating in said chamber.

2. In a double-walled storage tank for the low temperature storage of liquid materials comprising an inner storage vessel and an outer shell encompassing said inner vessel and spaced apart therefrom to provide an insulation space and a vapor barrier, said shell being constructed from a material of construction susceptible to embrittlement and loss in ductility at the temperature of the stored material; a safety device for preventing the accumulation of any stored liquid in the insulation space which comprises an accumulator having an inlet means communicating with said insulation space immediately adjacent the lowest level thereof, an outlet means discharging to the exterior of said tank, a chamber disposed below the lowest level of said insulation spaced and a flow control means closing said outlet means, said flow control means being normally closed and having a poppet valve closure means at least partially controllable by a head of fluid accumulating in said chamber.

3. In a double-walled storage tank for the low temperature storage of liquid materials comprising an inner storage vessel and an outer shell encompassing said inner vessel and spaced apart therefrom to provide an insulation space and a vapor barrier, said shell being constructed from a material of construction susceptible to embrittlement and loss in ductility at the temperature of the stored material; a safety device for preventing the accumulation of any stored liquid in the insulation space which comprises an accumulator having an inlet means communicating with said insulation space immediately adjacent the lowest level thereof, an outlet means discharging to the exterior of said tank, a chamber having a volume substantially less than the volume of said insulation space disposed below the lowest level of said insulation space and a flow control means closing said outlet means, said flow control means being normally closed and having closure means at least partially controllable by a head of fluid accumulating in said chamber.

4. In a double-walled storage tank for the low temperature storage of liquid materials comprising an inner storage vessel and an outer shell encompassing said inner vessel and spaced apart therefrom to provide an insulation space and a vapor barrier, said shell being constructed from a material of construction susceptible to embrittlement and loss in ductility at the temperature of the stored material; a safety device for preventing the accumulation of any stored liquid in the insulation space which comprises an accumulator having an inlet means communicating with said insulation space immediately adjacent the lowest level thereof, an outlet means discharging to the exterior of said tank, a chamber having a volume susbtantially less than the volume of said insulation space disposed below the lowest level of said insulation space and a flow control means closing said outlet means, said flow control means being normally closed and having a poppet valve closure means at least partially controllable by a head of fluid accumulating in said chamber.

5. In a double-walled storage tank for the low temperature storage of liquid materials comprising an inner storage vessel and an outer shell encompassing said inner vessel and spaced apart therefrom to provide an insulation space and a vapor barrier, said shell being constructed from a material of construction susceptible to embrittlement and loss in ductility at the temperature of the stored material; a safety device for preventing the accumulation of any stored liquid in the insulation space which comprises an accumulator having an inlet means communicating with said insulation space immediately adjacent the lowest level thereof, an outlet means discharging to the exterior of said tank and having an upwardly directed outlet port forming a valve seat, a chamber having a volume substantially less than the volume of said insulation space disposed below the lowest level of said insulation space and a flow control means closing said outlet means, said flow control means being normally closed and having a poppet valve closure means resting on said valve seat at least partially controllable by a head of fluid accumulating in said chamber.

References Cited in the file of this patent
UNITED STATES PATENTS

| | | |
|---|---|---|
| 2,256,679 | Kornemann et al. | Sept. 23, 1941 |
| 2,464,827 | Noyes | Mar. 22, 1949 |